US009746068B2

(12) United States Patent
Tahara et al.

(10) Patent No.: US 9,746,068 B2
(45) Date of Patent: Aug. 29, 2017

(54) LUBRICATING STRUCTURE FOR VEHICLE DRIVE SYSTEM

(71) Applicants: Aisin Seiki Kabushiki Kaisha, Kariya-shi (JP); TOYOTA JIDOSHA KABUSHIKI KAISHA, Toyota-shi (JP)

(72) Inventors: Yasuaki Tahara, Nagoya (JP); Tsuyoshi Kimura, Toyota (JP); Jun Mikami, Toyota (JP); Noriaki Nonaka, Chiryu (JP); Masaya Michishita, Okazaki (JP)

(73) Assignees: AISIN SEIKI KABUSHIKI KAISHA, Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 71 days.

(21) Appl. No.: 14/979,392

(22) Filed: Dec. 27, 2015

(65) Prior Publication Data

US 2016/0186854 A1    Jun. 30, 2016

(30) Foreign Application Priority Data

Dec. 24, 2014 (JP) ................. 2014-261188

(51) Int. Cl.
*F16H 57/04* (2010.01)

(52) U.S. Cl.
CPC ....... *F16H 57/0424* (2013.01); *F16H 57/045* (2013.01); *F16H 57/0427* (2013.01)

(58) Field of Classification Search
CPC ............. F16H 57/0409; F16H 57/0421; F16H 57/045; F16H 57/0457; F16H 57/048; F16H 57/0424; F16H 57/0427
See application file for complete search history.

(56) References Cited

U.S. PATENT DOCUMENTS

| 2,049,234 | A | * | 7/1936 | Thomas | ............... F16H 57/0421 |
| | | | | | 184/11.1 |
| 3,529,698 | A | * | 9/1970 | Nelson | .................... B61C 17/08 |
| | | | | | 184/11.2 |
| 4,470,324 | A | * | 9/1984 | Renk | .................... F16H 57/0423 |
| | | | | | 277/409 |
| 4,648,485 | A | * | 3/1987 | Kovaleski | ............... F01D 25/18 |
| | | | | | 184/13.1 |

(Continued)

FOREIGN PATENT DOCUMENTS

| JP | 2006307908 A | * 11/2006 | ......... F16H 57/0447 |
| JP | 2010-223376 | 10/2010 | |

(Continued)

*Primary Examiner* — Michael Riegelman
(74) *Attorney, Agent, or Firm* — Oblon, McClelland, Maier & Neustadt, L.L.P.

(57) ABSTRACT

A partition member including a bearing portion that supports a bearing for a first drive gear and a bearing for a second driven gear includes a partition wall portion. In the partition wall portion, a scoop-up wall that scoops up lubricating oil in cooperation with at least one of a first driven gear and the second driven gear is provided near the at least one of the first driven gear and the second driven gear, and a rib for reinforcing stiffness of the bearing portion is provided on a back face of the scoop-up wall.

7 Claims, 6 Drawing Sheets

(56) References Cited

U.S. PATENT DOCUMENTS

| | | | |
|---|---|---|---|
| 5,768,954 A * | 6/1998 | Grabherr | F16H 57/0447 184/11.1 |
| 5,821,653 A * | 10/1998 | Kinto | B60K 1/00 310/58 |
| 6,864,607 B2 * | 3/2005 | Hashimoto | B60K 1/00 180/65.1 |
| 7,421,921 B2 * | 9/2008 | Kimura | F16H 57/043 184/1.5 |
| 8,181,548 B2 | 5/2012 | Michishita | |
| 8,746,405 B2 * | 6/2014 | Perakes | F16H 57/0409 184/6.12 |
| 8,899,381 B2 * | 12/2014 | Ebihara | B60K 7/0007 184/6.12 |
| 9,103,432 B2 * | 8/2015 | Isomura | F16H 57/0423 |
| 2004/0154846 A1 * | 8/2004 | Kira | B60K 6/405 180/65.6 |
| 2008/0041179 A1 * | 2/2008 | Yasui | F16H 57/027 74/467 |
| 2008/0308354 A1 * | 12/2008 | Gratzer | B60K 17/344 184/6.12 |
| 2009/0165587 A1 * | 7/2009 | Ariga | F16H 57/0423 74/467 |
| 2010/0050800 A1 * | 3/2010 | Michishita | B60K 6/36 74/421 A |
| 2010/0180721 A1 * | 7/2010 | Quehenberger | F16H 57/0419 74/606 R |
| 2011/0041649 A1 * | 2/2011 | Iwata | F16H 57/0447 74/606 R |
| 2011/0192245 A1 * | 8/2011 | Shioiri | F16H 57/0423 74/467 |
| 2011/0245010 A1 * | 10/2011 | Nobata | F16H 57/0457 475/160 |
| 2012/0096968 A1 * | 4/2012 | Kawamoto | F16H 57/0409 74/467 |
| 2013/0145879 A1 * | 6/2013 | Nakamura | F16H 57/042 74/467 |
| 2015/0152954 A1 * | 6/2015 | Kajikawa | F16H 57/045 475/150 |
| 2016/0123454 A1 * | 5/2016 | Tahara | F16H 57/0409 74/467 |
| 2016/0123455 A1 * | 5/2016 | Mikami | F16H 57/0424 74/467 |
| 2016/0153546 A1 * | 6/2016 | Ogawa | F16H 57/0457 475/152 |
| 2016/0186854 A1 * | 6/2016 | Tahara | F16H 57/0424 74/468 |
| 2016/0186855 A1 * | 6/2016 | Tahara | F16H 57/0471 74/413 |
| 2017/0102064 A1 * | 4/2017 | Preston | F16H 57/0457 |

FOREIGN PATENT DOCUMENTS

| | | |
|---|---|---|
| JP | 4743241 | 8/2011 |
| JP | 2012189176 A * | 10/2012 |
| JP | 2014-101959 | 6/2014 |

* cited by examiner

LUBRICATING STRUCTURE FOR VEHICLE DRIVE SYSTEM

The disclosure of Japanese Patent Application No. 2014-261188 filed on Dec. 24, 2014 including the specification, drawings and abstract is incorporated herein by reference in its entirety.

BACKGROUND OF THE INVENTION

1. Field of the Invention

The invention relates to a lubricating structure for a vehicle drive system and, more particularly, to a lubricating structure for a dual-axis vehicle drive system, which includes, inside a case of the vehicle drive system, a first reduction gear pair provided between an output shaft of an electric motor and a counter shaft parallel to the output shaft and a second reduction gear pair provided between the counter shaft and a drive output shaft parallel to the counter shaft, and which reduces the stirring resistance of the first reduction gear pair and the stirring resistance of the second reduction gear pair during traveling of a vehicle by scooping up lubricating oil, which is stored at a bottom inside the case and supplied to a lubricated portion, with the use of the first reduction gear pair and the second reduction gear pair and then storing part of the lubricating oil in a catch tank.

2. Description of Related Art

In order to provide space for arranging a catch tank, separate space for arranging an electric motor and space for arranging gears from each other and ensure sufficient support stiffness, there is known a lubricating structure for a dual-axis vehicle drive system in which a case is split into multiple parts (see, for example, Japanese Patent Application Publication No. 2010-223376 (JP 2010-223376A)).

SUMMARY OF THE INVENTION

In this way, in the lubricating structure for a dual-axis vehicle drive system in which a case is split into multiple parts, in recent years, gears are respectively provided near both side faces inside one of the split cases, and it is desired that members supporting bearings of those gears ensure support stiffness and improve the efficiency of scooping up lubricating oil with the gears.

The invention provides a lubricating structure for a vehicle drive system, in which gears are respectively provided near both side faces inside a case of the vehicle drive system and members supporting bearings of the gears are able to ensure support stiffness and improve the efficiency of scooping up lubricating oil with the gears.

An aspect of the invention provides a lubricating structure for a vehicle drive system. The lubricating structure includes: a case; an electric motor arranged inside the case; a first reduction gear pair provided between an output shaft of the electric motor and a counter shaft parallel to the output shaft, the first reduction gear pair including a first drive gear and a first driven gear that is in mesh with the first drive gear; a second reduction gear pair provided between the counter shaft and a drive output shaft parallel to the counter shaft, the second reduction gear pair including a second drive gear and a second driven gear that is in mesh with the second drive gear; a first catch tank arranged inside the case; a second catch tank arranged inside the case; a first oil passage that guides lubricating oil, stored at a bottom in the case and scooped up by the first driven gear, to the first catch tank; and a second oil passage that guides lubricating oil, stored at the bottom in the case and scooped up by the second driven gear, to the second catch tank. The case includes a first accommodation member, a second accommodation member and a partition member. The first accommodation member accommodates the first reduction gear pair. The second accommodation member accommodates the second reduction gear pair. The partition member is held between the first accommodation member and the second accommodation member. The partition member includes a bearing portion and a side wall of the second catch tank. The bearing portion supports a bearing for the first drive gear and a bearing for the second driven gear. The partition member includes a partition wall portion. One side face portion of the partition wall portion and the first accommodation member define a first gear chamber in which the first reduction gear pair is accommodated. The other side face portion of the partition wall portion and the second accommodation member define a second gear chamber in which the second reduction gear pair is accommodated. In the partition wall portion, a scoop-up wall that scoops up the lubricating oil in cooperation with at least one of the first driven gear and the second driven gear is provided near the at least one of the first driven gear and the second driven gear, and a rib for reinforcing stiffness of the bearing portion is provided on a back face of the scoop-up wall.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
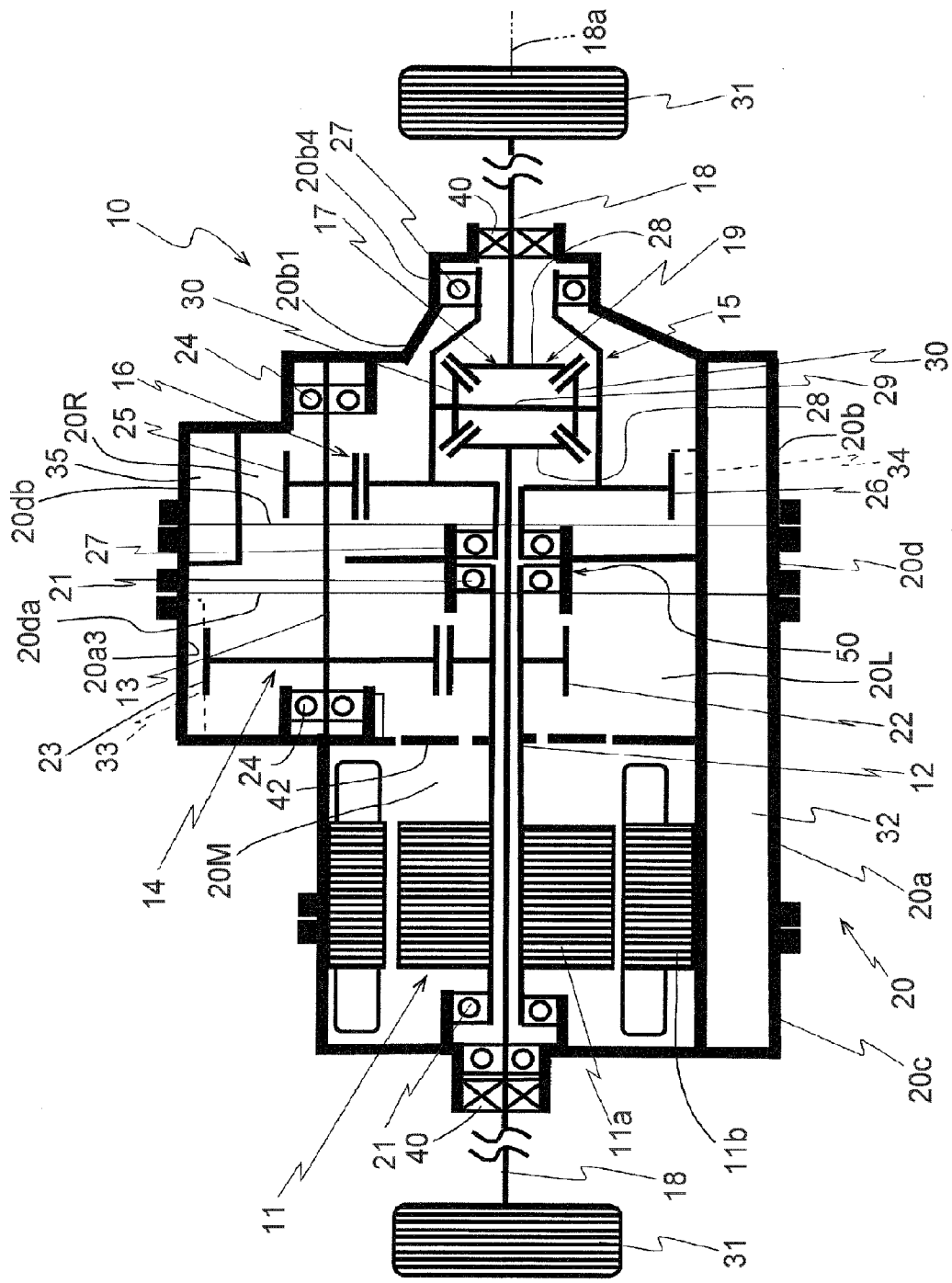
FIG. 1 is a skeletal view that illustrates the schematic configuration of a rear transaxle of a vehicle to which the invention is applied.

An embodiment of the invention will be described in detail with reference to the accompanying drawings. Like reference numerals denote the same or corresponding members in the drawings referenced below.

FIG. 1 is a skeletal view that shows the configuration of a rear transaxle 10 in an electric four-wheel-drive vehicle to which the lubricating structure for a vehicle drive system according to the invention is applied. The rear transaxle 10 is a dual-axis electric vehicle drive system. The rear transaxle 10 includes an electric motor 11 as a drive source, a first reduction gear pair 14, a second reduction gear pair 16 and a differential gear unit 19 inside a transaxle case 20. The first reduction gear pair 14 is provided between an output shaft 12 of the electric motor 11 and a counter shaft 13 parallel to the output shaft 12. The second reduction gear pair 16 is provided between the counter shaft 13 and a differential case 15 parallel to the counter shaft 13 and concentric with the electric motor 11. The differential gear unit 19 includes a differential mechanism 17 provided inside the differential case 15. The differential gear unit 19 drives a pair of rear axles 18 (each of which is an example of a drive output shaft) to rotate by the use of torque transmitted from the electric motor 11 via the first reduction gear pair 14 and the second reduction gear pair 16.

A rotor 11a of the electric motor 11 is coupled to the center portion of the output shaft 12. A pair of bearings 21 are fitted to both ends of the output shaft 12. Thus, the output shaft 12 is rotatably supported by the transaxle case 20 via the pair of bearings 21. A stator coil unit 11b is provided around the rotor 11a, and is fixed to the transaxle case 20.

The first reduction gear pair 14 consists of a small-diameter counter drive gear 22 (which is an example of a first drive gear) and a large-diameter counter driven gear 23 (which is an example of a first driven gear). The counter drive gear 22 is integrally fixed to the distal end side of one end of the output shaft 12. The counter driven gear 23 is integrally fixed to one end side of the counter shaft 13 in a state where the counter driven gear 23 is in mesh with the counter drive gear 22. The output shaft 12 and the counter shaft 13 parallel to the output shaft 12 correspond to the rotary shafts of the first reduction gear pair 14.

The counter shaft 13 is provided on the vehicle front side with respect to the concentric output shaft 12, differential case 15, the counter drive gear 22 fixed to the output shaft 12 and a final driven gear 26 (described later) fixed to the differential case 15. Thus, the counter driven gear 23 is arranged at the frontmost side inside the transaxle case 20. A pair of bearings 24 are respectively fitted to both ends of the counter shaft 13. The counter shaft 13 is rotatably supported by the transaxle case 20 via these pair of bearings 24.

As shown in FIG. 1, the second reduction gear pair 16 is arranged so as to be displaced in the rotation axis direction of the first reduction gear pair 14. The second reduction gear pair 16 consists of a small-diameter final drive gear 25 (which is an example of a second drive gear) and the large-diameter final driven gear 26 (which is an example of a second driven gear). The final drive gear 25 is integrally fixed to the other end of the counter shaft 13. The final driven gear 26 is arranged so as to be displaced from the counter drive gear 22 in the axial direction of the output shaft 12. The final driven gear 26 is fitted to the outer peripheral portion of the differential case 15 and integrally fixed in a state where the final driven gear 26 is in mesh with the final drive gear 25.

A pair of bearings 27 are respectively fitted to the outer peripheries of both axial ends of the differential case 15. Therefore, the differential case 15 and the final driven gear 26 integrally fixed to the differential case 15 are rotatably supported by the transaxle case 20 via these pair of bearings 27.

The differential mechanism 17 is of a generally known so-called bevel gear type. The differential mechanism 17 includes a pair of side gears 28 and a pair of pinion gears 30. The pair of side gears 28 are opposed to each other along the rotation axis inside the differential case 15. The pair of pinion gears 30 are rotatably supported by a pinion shaft 29 between these pair of side gears 28, and each are in mesh with the pair of side gears 28. The pinion shaft 29 is fixed to the differential case 15 in a state where the pinion shaft 29 is perpendicular to the rotation axis of the differential case 15.

The pair of rear axles 18 are respectively integrally coupled to the pair of side gears 28. The differential gear unit 19 that includes the differential case 15 and the differential mechanism 17 drives the pair of rear axles 18 (each of which is an example of a drive output shaft) to rotate by the use of torque transmitted from the electric motor 11 via the first reduction gear pair 14 and the second reduction gear pair 16 while allowing a rotation speed difference between the pair of rear axles 18. The output shaft 12 of the electric motor 11 and the pair of rear axles 18 are arranged along the same axis 18a. As shown in FIG. 1, one of the pair of rear axles 18 is inserted through the hollow cylindrical output shaft 12 and is coupled to a vehicle left-side one of a pair of rear wheels 31. A pair of seal members 40 (shown in FIG. 1) are respectively provided between one of the pair of rear axles 18 and the transaxle case 20 and between the other one of the pair of rear axles 18 and the transaxle case 20.

As shown in FIG. 1, the transaxle case 20 is formed of four split portions in the direction of the axis 18a of the rear axles 18. The transaxle case 20 includes a cylindrical first split case portion 20a (which is an example of a first accommodation member), a lid-shaped second split case portion 20b (which is an example of a second accommodation member), a lid-shaped third split case portion 20c and a partition member 20d. The first split case portion 20a accommodates the first reduction gear pair 14. The second split case portion 20b accommodates the second reduction gear pair 16. The third split case portion 20c mainly accommodates the electric motor 11. The partition member 20d is held between the first split case portion 20a and the second split case portion 20b. The partition member 20d includes a bearing portion 50 and a side wall 35b (see FIG. 4 and FIG. 6) of a second catch tank 35 (described later). The bearing portion 50 supports the bearing 21 for the counter drive gear 22 and the bearing 27 for the final driven gear 26. The bearing portion 50 of the partition member 20d supports one of the above-described pair of bearings 21 and one of the above-described pair of bearings 27 along the same axis 18a along which the output shaft 12 of the electric motor 11 and the rear axles 18 are arranged, as shown in FIG. 1. The first split case portion 20a, the second split case portion 20b, the third split case portion 20c and the partition member 20d are fastened to one another by bolts (not shown) in an oil-tight manner as shown in FIG. 1. These split case portions 20a, 20b, 20c and partition member 20d are made of a cast light alloy, for example, by aluminum die-casting, or the like.

The partition member 20d includes a partition wall portion 20d1. The partition wall portion 20d1 defines a first gear chamber 20L (see FIG. 1) between a left side face portion 20da (see FIG. 1, FIG. 5 and FIG. 6, and which is an example of one side face portion) and the first split case portion 20a. The first reduction gear pair 14 is accommodated in the first gear chamber 20L. The partition wall portion 20d1 defines a second gear chamber 20R (see FIG. 1) between a right side face portion 20db (see FIG. 1, FIG. 4 and FIG. 6, and which is an example of the other side face portion) and the second split case portion 20b. The second reduction gear pair 16 is accommodated in the second gear chamber 20R.

A first side wall 20a1 (see FIG. 2) of the first split case portion 20a partitions the inside of the first split case portion 20a such that one side of the first split case portion 20a is the first gear chamber 20L and the other side of the first split case portion 20a is a motor chamber 20M. The electric motor 11 is accommodated in the motor chamber 20M. A resolver 42 (see FIG. 1) is provided in the motor chamber 20M. The resolver 42 detects the rotation of the electric motor 11.

The counter driven gear 23 and the final driven gear 26 are configured to rotate to supply lubricating oil to lubricated portions by scooping up lubricating oil stored at the bottom in the transaxle case 20. That is, scoop-up lubrication is employed in the rear transaxle 10 according to the present embodiment. The scoop-up lubrication is to supply lubricating oil to the lubricated portions by scooping up lubricating oil that is stored at the bottom inside the transaxle case 20. The lubricated portions are, for example, meshing portions of the first reduction gear pair 14 and second reduction gear pair 16, gear meshing portions and rotational sliding portions of the differential mechanism 17, the bearings 21, 24, 27, and the like.

Figure 2:
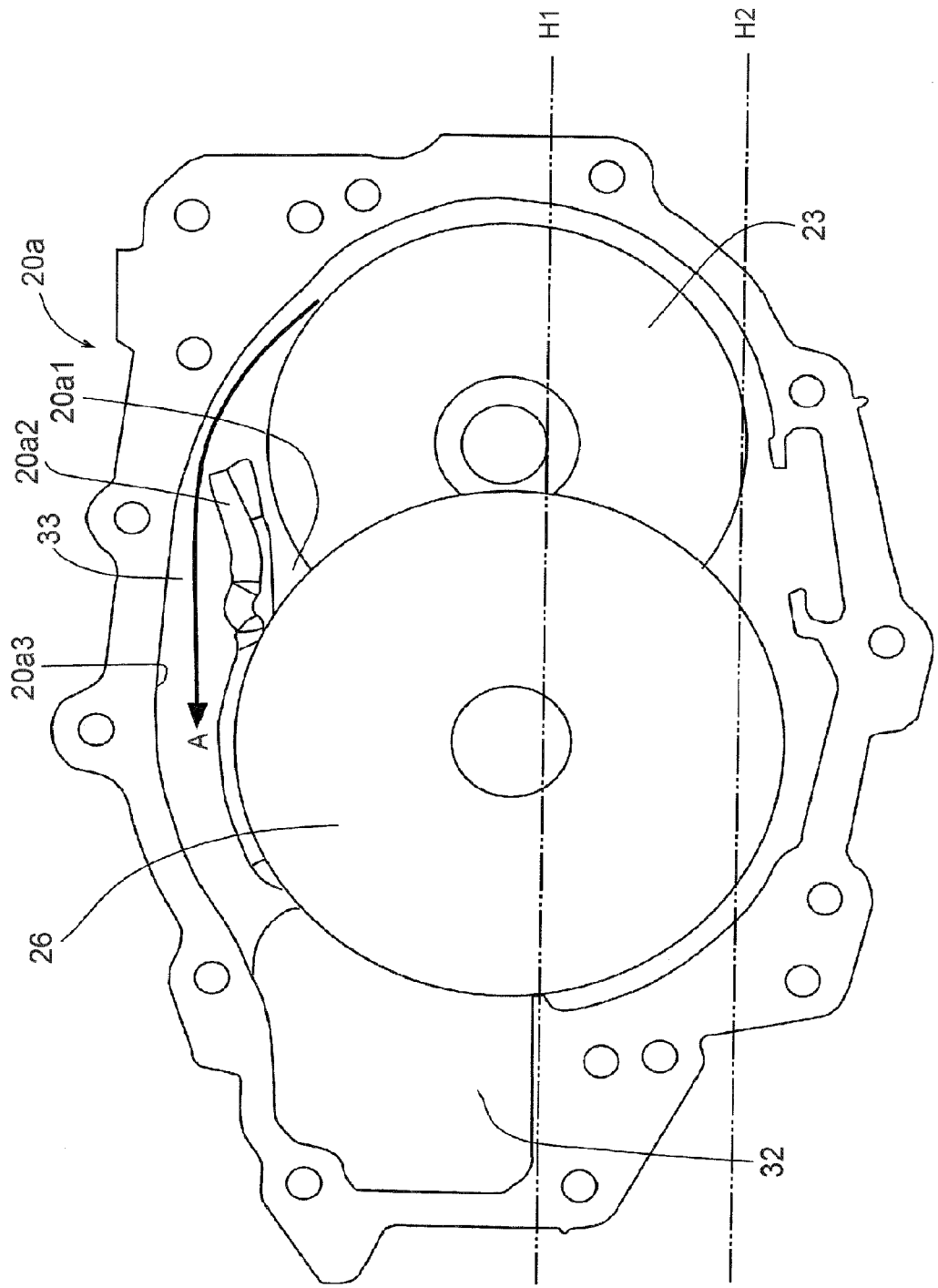
FIG. 2 is a front view that shows a side of a first split case portion of a transaxle case according to an embodiment of the invention, which is a mating face with a partition member.
Figure 3:
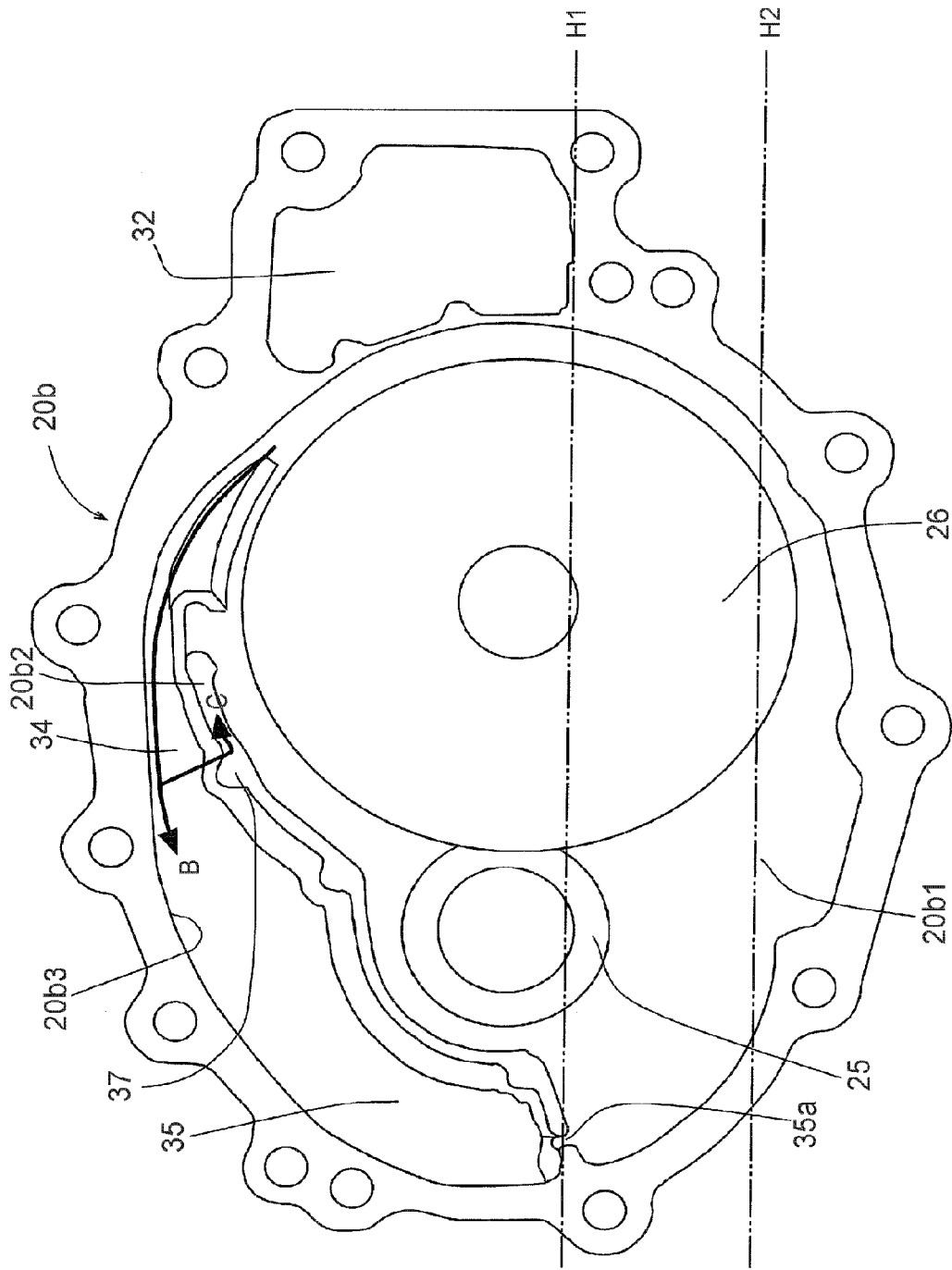
FIG. 3 is a front view that shows a side of a second split case portion of the transaxle case according to the embodiment of the invention, which is a mating face with the partition member.

The transaxle case 20 includes a first catch tank 32 for storing part of scooped-up lubricating oil in order to lower the oil level position of lubricating oil that is stored at the bottom inside the transaxle case 20 for the purpose of reducing the stirring resistance of lubricating oil against the counter driven gear 23, which increases with an increase in vehicle speed V. As shown in FIG. 2 and FIG. 3, the first catch tank 32 is provided over the split case portions 20a, 20b, 20c and the partition member 20d such that lubricating oil is stored at a position higher than the level H1 of oil at the bottom in the transaxle case 20. The level H1 of oil is the height of lubricating oil that is stored at the bottom in the transaxle case 20 when the vehicle is stopped.

Because most of lubricating oil that is scooped up by the counter driven gear 23 of the first reduction gear pair 14 is splashed upward and rearward as indicated by the arrow A in FIG. 2, the first catch tank 32 is arranged at a position at which the first catch tank 32 is able to efficiently contain scooped-up lubricating oil, that is, at the rearmost side of the transaxle case 20.

Thus, the lubricating oil scoop-up operation of the counter driven gear 23 that is higher in rotation speed and higher in ability to scoop up lubricating oil (that has a larger scoop-up amount) than the final driven gear 26 of the second reduction gear pair 16 is smoothly carried out. Lubricating oil stored in the first catch tank 32 is supplied from a lubricating oil supply port (not shown) provided in the first catch tank 32 to a lubricated portion, overflows from the first catch tank 32 as a result of accumulation of lubricating oil at or above a predetermined amount or is supplied as naturally drained oil from a drain port (not shown), provided at the bottom of the first catch tank 32, to lubrication required portions, such as bearings and oil seals that are not immersed in lubricating oil as a result of a decrease in the oil level position at the bottom in the transaxle case 20. Thus, lubricating oil is returned to the bottom inside the transaxle case 20.

A first oil passage 33 is provided inside the first split case portion 20a of the transaxle case 20, that is, the first gear chamber 20L. The first oil passage 33 guides lubricating oil, which is scooped up by the counter driven gear 23 of the first reduction gear pair 14, to the first catch tank 32 as indicated by the arrow A in FIG. 2. On the other hand, a second oil passage 34 is provided inside the second split case portion 20b of the transaxle case 20, that is, the second gear chamber 20R. The second oil passage 34 guides lubricating oil, which is scooped up by the final driven gear 26 of the second reduction gear pair 16, to the second catch tank 35 as indicated by the arrow B in FIG. 3. As shown in FIG. 1, the second oil passage 34 is arranged so as to be displaced with respect to the first oil passage 33 in the axial direction of the counter shaft 13 (that is, rightward in FIG. 1) that is the rotary shaft of the counter driven gear 23 of the first reduction gear pair 14. The arrangement position of the second oil passage 34 is also a position displaced with respect to the first oil passage 33 in the axial direction of the output shaft 12 (that is, rightward in FIG. 1) that is the rotary shaft of the counter drive gear 22 of the first reduction gear pair 14. That is, the second oil passage 34 is arranged so as to be displaced with respect to the first oil passage 33 in the rotation axis direction of the first reduction gear pair 14.

As shown in FIG. 2, the first oil passage 33 is formed on the outer periphery of a first oil passage wall 20a2 extending from the first side wall 20a1 of the first split case portion 20a. The first oil passage 33 is radially defined by the outer periphery of the first oil passage wall 20a2 and an outer peripheral wall 20a3 of the first split case portion 20a. The first oil passage 33 guides lubricating oil, which is scooped up by the counter driven gear 23, to the first catch tank 32.

As shown in FIG. 3, the second oil passage 34 is formed on the outer periphery of a second oil passage wall 20b2 extending from a second side wall 20b1 of the second split case portion 20b. The second oil passage 34 is radially defined by the outer periphery of the second oil passage wall 20b2 and an outer peripheral wall 20b3 of the second split case portion 20b. The second oil passage 34 guides lubricating oil, which is scooped up by the final driven gear 26, to the second catch tank 35. As shown in FIG. 2 and FIG. 3, the second catch tank 35 is provided at a position higher than the level H1 of oil at the bottom in the transaxle case 20 as in the case of the first catch tank 32 in order to store scooped-up lubricating oil and lower the oil level position of lubricating oil that is stored at the bottom inside the transaxle case 20.

The second catch tank 35 is radially defined by the outer periphery of the second oil passage wall 20b2, a tank wall 20d2 (see FIG. 4) extending from the partition wall portion 20d1 of the partition member 20d, the outer peripheral wall 20b3 of the second split case portion 20b and an outer peripheral wall 20d3 (see FIG. 4) of the partition member 20d. The second catch tank 35 is defined in the axial direction by the second side wall 20b1 of the second split case portion 20b and the partition wall portion 20d1 of the partition member 20d. The second catch tank 35 has a drain hole 35a (see FIG. 3) at its bottom. The drain hole 35a drains lubricating oil. Lubricating oil guided to the second catch tank 35 naturally drains from the drain hole 35a, and is returned to the bottom inside the transaxle case 20.

Figure 4:
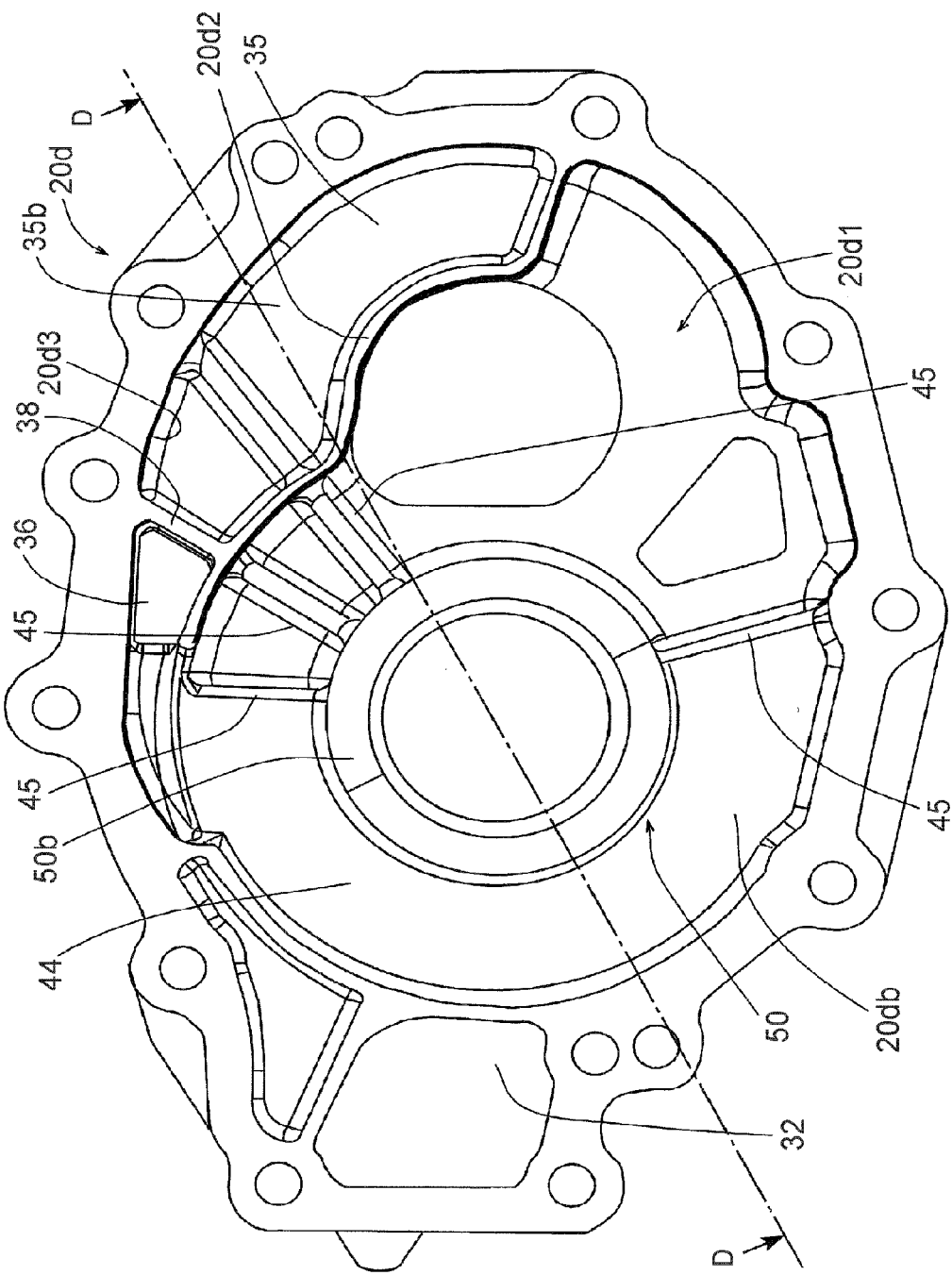
FIG. 4 is a perspective view that shows a side of the partition member of the transaxle case according to the embodiment of the invention, which is a mating face with the second split case portion.

As shown in FIG. 4, the partition wall portion 20d1 of the partition member 20d has a window 36 as a communication port that provides communication between the first oil passage 33 and the second oil passage 34. The window 36 is provided at an upper side to which lubricating oil is scooped up. As shown in FIG. 3, the second split case portion 20b has a weir 37 on the outer periphery of the second oil passage wall 20b2. The weir 37 is able to guide lubricating oil, scooped up to the second oil passage 34, to the window 36. The weir 37 is provided by utilizing an ejector pin seat that is generally provided in order to easily remove the second split case portion 20b from a die at the time of casting the second split case portion 20b. The weir 37 is provided at a downstream side near a position corresponding to the window 36 to the second oil passage 34. As shown in FIG. 3, the weir 37 works to guide part of flow (indicated by the arrow B) of lubricating oil scooped up to the second oil passage 34 such that the part of flow of the scooped-up lubricating oil changes its direction toward the window 36 and merges into the first oil passage 33 as indicated by the arrow C. As shown in FIG. 4, a guide wall 38 extending from the partition wall portion 20d1 of the partition member 20d connects the tank wall 20d2 with the outer peripheral wall 20d3, and guides lubricating oil, guided as indicated by the arrow C, to the window 36.

Via the window 36 provided in the partition member 20d, the second oil passage 34 that guides scooped-up lubricating oil to the second catch tank 35 communicates with the first oil passage 33 that guides scooped-up lubricating oil to the first catch tank 32. Thus, of the two catch tanks 32, 35, that is, the first catch tank 32 and the second catch tank 35 to each of which scooped-up lubricating oil is guided and stored, even when the second catch tank 35 becomes full of lubricating oil first and has no room to contain lubricating oil, excess lubricating oil is guided as indicated by the arrow C in FIG. 3 via the window 36 to the first catch tank 32 that still has room to store lubricating oil. Even when the first catch tank 32 becomes full of lubricating oil first and has no room to contain lubricating oil, excess lubricating oil merges from the first oil passage 33 via the window 36 into the second oil passage 34, and is guided to the second catch tank 35 that still has room to store lubricating oil.

As shown in FIG. 2 and FIG. 3, in a state where the vehicle is stopped, the counter driven gear 23 of the first reduction gear pair 14 and the final driven gear 26 of the second reduction gear pair 16 are arranged at the level at which at least substantially the lower half of the counter driven gear 23 of the first reduction gear pair 14 and the lower half of the final driven gear 26 of the second reduction gear pair 16 are immersed in lubricating oil that is stored at the bottom in the transaxle case 20. The level H1 indicated by the alternate long and two-short dashes line in FIG. 2 and FIG. 3 indicates the height of lubricating oil that is stored at the bottom in the transaxle case 20 during a stop of the vehicle. The rotor 11a and stator coil unit 11b of the electric motor 11 are also arranged at the level at which at least substantially the lower half of each of the rotor 11a and stator coil unit 11b of the electric motor 11 is immersed in lubricating oil that is stored at the bottom in the transaxle case 20 during a stop of the vehicle.

The vehicle starts traveling, the scoop-up amount of lubricating oil that is stored at the bottom in the transaxle case 20 increases with an increase in vehicle speed, and the height of the lubricating oil gradually begins to decrease from the level H1. In a state where the vehicle speed is substantially 50 kilometers per hour, the height of lubricating oil that is stored at the bottom in the transaxle case 20 is the level H2 indicated by the alternate long and two-short dashes line in FIG. 2 and FIG. 3, and even the lowermost portion of the counter driven gear 23 of the first reduction gear pair 14 is almost not immersed in lubricating oil. On the other hand, the lower end of the final driven gear 26 of the second reduction gear pair 16 is kept immersed in lubricating oil.

Therefore, even when the vehicle speed reaches substantially 50 kilometers per hour and it becomes difficult for the counter driven gear 23, which is higher in ability to scoop up lubricating oil than the final driven gear 26, to scoop up lubricating oil from the bottom in the transaxle case 20, the state where lubricating oil is allowed to be scooped up by the final driven gear 26 is maintained. Structurally, rotation of the final driven gear 26 is slower than that of the counter driven gear 23; however, when the vehicle speed is substantially 50 kilometers per hour, rotation of the final driven gear 26 is also increased, so it is possible to scoop up lubricating oil from the bottom in the transaxle case 20 with the use of only the final driven gear 26.

Figure 5:
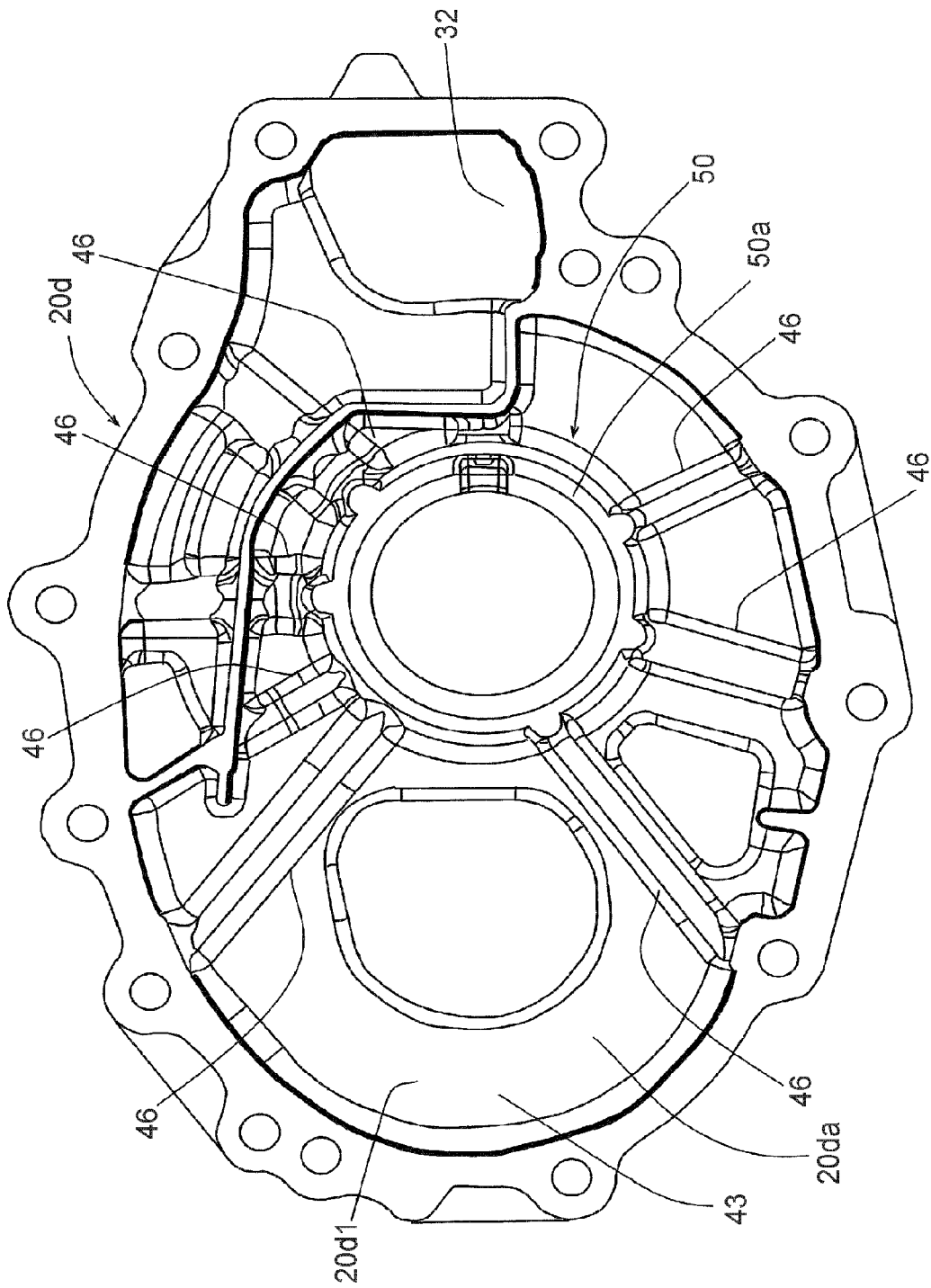
FIG. 5 is a perspective view that shows a side of the partition member of the transaxle case according to the embodiment of the invention, which is a mating face with the first split case portion.
Figure 6:
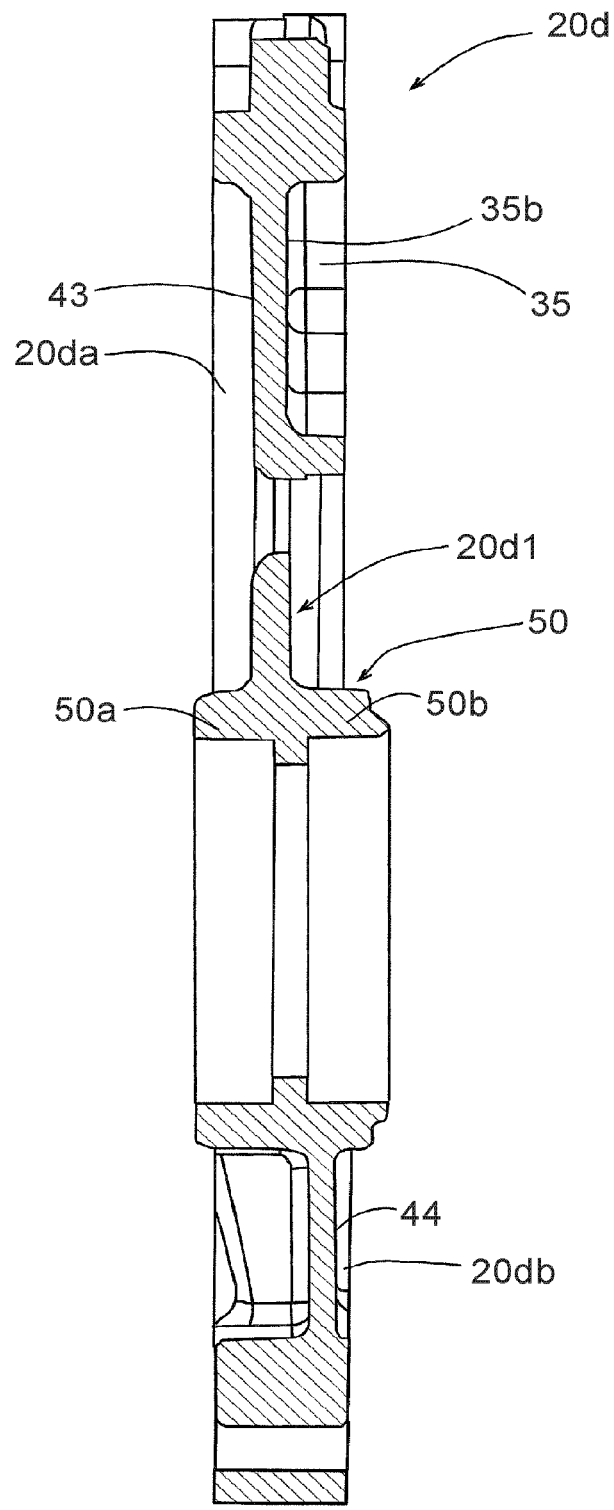
FIG. 6 is a cross-sectional view taken along the line D-D in FIG. 4.

As shown in FIG. 6, the above-described bearing portion 50 of the partition member 20d includes a first support portion 50a and a second support portion 50b at the inner peripheral portion of the partition wall portion 20d1. The first support portion 50a supports the bearing 21 of the counter drive gear 22. The first support portion 50a supports the bearing 27 of the final driven gear 26. As shown in FIG. 5, the partition wall portion 20d1 of the partition member 20d includes a first scoop-up wall 43 (which is an example of a scoop-up wall) at a portion near the counter driven gear 23, that is, the near side in FIG. 5 and the left side in FIG. 6. The first scoop-up wall 43 scoops up lubricating oil in cooperation with the counter driven gear 23. Thus, by narrowing the clearance between the first scoop-up wall 43 and the side face of the counter driven gear 23, it is possible to increase the efficiency of scooping up lubricating oil, stored at the bottom in the transaxle case 20, with the counter driven gear 23.

As shown in FIG. 4, the partition wall portion 20d1 of the partition member 20d includes a second scoop-up wall 44 (which is an example of a scoop-up wall) at a portion near the final driven gear 26, that is, the near side in FIG. 4 and the right side in FIG. 6. The second scoop-up wall 44 scoops up lubricating oil in cooperation with the final driven gear 26. Thus, by narrowing the clearance between the second scoop-up wall 44 and the side face of the final driven gear 26, it is possible to increase the efficiency of scooping up lubricating oil, stored at the bottom in the transaxle case 20, with the final driven gear 26.

As shown in FIG. 4, a plurality of first ribs 45 (each of which is an example of a rib) radially extend from the second support portion 50b of the bearing portion 50 on the back face of the first scoop-up wall 43 in the partition wall portion 20d1 of the partition member 20d. By providing the first ribs 45, it is possible to reinforce the partition wall portion 20d1 and increase the support stiffness of the second support portion 50b on which a load from the bearing 27 is exerted. That is, it is possible to reinforce the stiffness of the bearing portion 50 by the use of the first ribs 45.

As shown in FIG. 5, a plurality of second ribs 46 (each of which is an example of a rib) radially extends from the first support portion 50a of the bearing portion 50 on the back face of the second scoop-up wall 44 in the partition wall portion 20d1 of the partition member 20d. By providing the second ribs 46, it is possible to reinforce the partition wall portion 20d1 and increase the support stiffness of the first support portion 50a on which a load from the bearing 21 is exerted. That is, it is possible to reinforce the stiffness of the bearing portion 50 by the use of the second ribs 46.

The second catch tank 35 is provided in the second gear chamber 20R. The side wall 35b of the second catch tank 35 is provided on the back side of the first scoop-up wall 43 that scoops up lubricating oil in cooperation with the counter driven gear 23 in the partition wall portion 20d1. That is, as described above, because the first scoop-up wall 43 is provided on the left side of the partition member 20d as shown in FIG. 6, the side wall 35b of the second catch tank 35 is also provided at a far-side position in FIG. 4 in the partition member 20d, so it is possible to increase the capacity of the second catch tank 35.

As described above, the lubricating structure for a vehicle drive system according to the present embodiment is the lubricating structure for the rear transaxle 10 (which is an example of a vehicle drive system). The lubricating structure includes the electric motor 11, the first reduction gear pair 14, the second reduction gear pair 16, the first catch tank 32, the second catch tank 35, the first oil passage 33 and the second oil passage 34. The electric motor 11 is arranged inside the transaxle case 20 (which is an example of a case) of the vehicle drive system. The first reduction gear pair 14 is provided between the output shaft 12 of the electric motor 11 and the counter shaft 13 parallel to the output shaft 12, and includes the counter drive gear 22 (which is an example of a first drive gear) and the counter driven gear 23 (which is an example of a first driven gear) that is in mesh with the counter drive gear 22. The second reduction gear pair 16 is provided between the counter shaft 13 and one of the rear axles 18 (each of which is an example of a drive output shaft) parallel to the counter shaft 13, and includes the final drive gear 25 (which is an example of a second drive gear) and the final driven gear 26 (which is an example of a second driven gear) that is in mesh with the final drive gear 25. The first catch tank 32 is arranged inside the transaxle case 20. The second catch tank 35 is arranged inside the transaxle case 20. The first oil passage 33 guides lubricating oil, stored at the bottom in the transaxle case 20 and scooped up by the counter driven gear 23, to the first catch tank 32. The second oil passage 34 guides lubricating oil, stored at the bottom in the transaxle case 20 and scooped up by the final driven gear 26, to the second catch tank 35. The transaxle case 20 includes the first split case portion 20a (which is an example of a first accommodation member), the second split case portion 20b (which is an example of a second accommodation member) and the partition member 20d. The first split case portion 20a accommodates the first reduction gear pair 14. The second split case portion 20b accommodates the second reduction gear pair 16. The partition member 20d is held between the first split case portion 20a and the second split case portion 20b. The partition member 20d includes the bearing portion 50 and the side wall 35b of the second catch tank 35. The bearing portion 50 supports the bearing 21 for the counter drive gear 22 and the bearing 27 for the final driven gear 26. The partition member 20d includes the partition wall portion 20d1. The partition wall portion 20d1 defines the first gear chamber 20L between the left side face portion 20da (which is an example of one side face portion) and the first split case portion 20a. The first reduction gear pair 14 is accommodated in the first gear chamber 20L. The partition wall portion 20d1 defines the second gear chamber 20R between the right side face portion 20db (which is an example of the other side face portion) and the second split case portion 20b. The second reduction gear pair 16 is accommodated in the second gear chamber 20R. The partition wall portion 20d1 includes the first scoop-up wall 43 or the second scoop-up wall 44 (which is an example of a scoop-up wall) near at least one of the counter driven gear 23 and the final driven gear 26. The first scoop-up wall 43 or the second scoop-up wall 44 scoops up lubricating oil in cooperation with the at least one of the counter driven gear 23 and the final driven gear 26. The first ribs 45 are provided on the back face of the first scoop-up wall 43 and the second ribs 46 are provided on the back face of the second scoop-up wall 44 in the partition wall portion 20d1 in order to reinforce the stiffness of the bearing portion 50. Thus, in the partition wall portion 20d1, the first scoop-up wall 43 or the second scoop-up wall 44 that scoops up lubricating oil in cooperation with at least one of the counter driven gear 23 and the final driven gear 26 is provided near the at least one of the counter driven gear 23 and the final driven gear 26, so the efficiency of scooping up lubricating oil improves. Because the first ribs 45 are provided on the back face of the first scoop-up wall 43 and the second ribs 46 are provided on the back face of the second scoop-up wall 44 in order to reinforce the stiffness of the bearing portion 50, it is possible to ensure the support stiffness of the bearing portion 50, and the first ribs 45 and the second ribs 46 do not influence scooping up by the first scoop-up wall 43 or the second scoop-up wall 44.

As described above, with the lubricating structure for a vehicle drive system according to the present embodiment, the output shaft 12 of the electric motor 11 and the rear axles 18 are arranged along the same axis 18a, and the bearing portion 50 supports the bearing 21 for the counter drive gear 22 and the bearing 27 for the final driven gear 26 side by side along the same axis 18a. Thus, because one of the rear axles 18 is allowed to be arranged such that one of the rear axles 18 is inserted through the output shaft 12 of the electric motor 11, it is possible to reduce the size of the drive system.

As described above, with the lubricating structure for a vehicle drive system according to the present embodiment, the second catch tank 35 is provided in the second gear chamber 20R, the at least one of the counter driven gear 23 and the final driven gear 26 is the counter driven gear 23, and the second catch tank 35 is provided in the partition wall portion 20d1 on the back side of the first scoop-up wall 43 that scoops up lubricating oil in cooperation with the counter driven gear 23. In the partition wall portion 20d1, the first scoop-up wall 43 that scoops up lubricating oil in cooperation with the counter driven gear 23 is provided near the counter driven gear 23. Thus, because the side wall 35b of the second catch tank 35 is provided adjacent to the counter driven gear 23, it is possible to increase the capacity of the second catch tank 35.

As described above, with the lubricating structure for a vehicle drive system according to the present embodiment, the first split case portion 20a includes the first side wall 20a1 that defines the first gear chamber 20L, the second split case portion 20b includes the second side wall 20b1 that defines the second gear chamber 20R, the first oil passage 33 is radially defined by the outer periphery of the first oil passage wall 20a2 extending from the first side wall 20a1 and the outer peripheral wall 20a3 of the first split case portion 20a, and the second oil passage 34 is radially defined by the outer periphery of the second oil passage wall 20b2 extending from the second side wall 20b1 and the outer peripheral wall 20b3 of the second split case portion 20b. Thus, it is possible to define the first oil passage 33 and the second oil passage 34 just by mating and fixing the first split case portion 20a and the second split case portion 20b to the partition member 20d.

In the present embodiment, the following configurations may be employed in order to obtain the above-described advantageous effects. That is, the partition wall portion 20d1 has the window 36 that provides communication between the first oil passage 33 and the second oil passage 34 and that is provided at an upper side to which lubricating oil is scooped up. When the weir 37 that guides lubricating oil, scooped up to the second oil passage 34, to the window 36 is provided on the outer periphery of the second oil passage wall 20b2 that defines the second oil passage 34, it is possible to guide part of the flow of lubricating oil scooped up by the second oil passage 34 to the window 36 by the weir 37 and allow the part of the flow to easily merge into the first oil passage 33 via the window 36. By providing the plurality of first ribs 45 and the plurality of second ribs 46 so as to radially extend from the bearing portion 50, it is possible to increase the support stiffness of the bearing portion 50 and to reinforce the stiffness of the bearing portion 50.

When there are a plurality of embodiments, unless otherwise specified, it is clear that characterized portions of the respective embodiments are allowed to be combined with each other as needed.

What is claimed is:

1. A lubricating structure for a vehicle drive system, the lubricating structure comprising:
    a case;
    an electric motor arranged inside the case;
    a first reduction gear pair provided between an output shaft of the electric motor and a counter shaft parallel to the output shaft, the first reduction gear pair including a first drive gear and a first driven gear that is in mesh with the first drive gear;
    a second reduction gear pair provided between the counter shaft and a drive output shaft parallel to the counter shaft, the second reduction gear pair including a second drive gear and a second driven gear that is in mesh with the second drive gear;
    a first catch tank arranged inside the case;
    a second catch tank arranged inside the case;
    a first oil passage that guides lubricating oil, stored at a bottom in the case and scooped up by the first driven gear, to the first catch tank; and
    a second oil passage that guides lubricating oil, stored at the bottom in the case and scooped up by the second driven gear, to the second catch tank, wherein:
    the case includes a first accommodation member, a second accommodation member and a partition member, the first accommodation member accommodates the first reduction gear pair, the second accommodation member accommodates the second reduction gear pair, the partition member is held between the first accommodation member and the second accommodation member, the partition member includes a bearing portion and a side wall of the second catch tank, and the bearing portion supports a bearing for the first drive gear and a bearing for the second driven gear;
    the partition member includes a partition wall portion, one side face portion of the partition wall portion and the first accommodation member define a first gear chamber in which the first reduction gear pair is accommodated, and the other side face portion of the partition wall portion and the second accommodation member define a second gear chamber in which the second reduction gear pair is accommodated; and
    in the partition wall portion, a scoop-up wall that scoops up the lubricating oil in cooperation with at least one of the first driven gear and the second driven gear is provided near the at least one of the first driven gear and the second driven gear, and a rib for reinforcing stiffness of the bearing portion is provided on a back face of the scoop-up wall.

2. The lubricating structure according to claim 1, wherein
the output shaft of the electric motor and the drive output shaft are arranged along the same axis, and
the bearing portion supports the bearing for the first drive gear and the bearing for the second driven gear side by side along the same axis.

3. The lubricating structure according to claim 1, wherein
the second catch tank is provided in the second gear chamber,
the at least one of the first driven gear and the second driven gear is the first driven gear, and
the second catch tank is provided in the partition wall portion on a back side of the scoop-up wall that scoops up the lubricating oil in cooperation with the first driven gear.

4. The lubricating structure according to claim 1, wherein
the first accommodation member includes a first side wall that defines the first gear chamber,
the second accommodation member includes a second side wall that defines the second gear chamber,
the first oil passage is radially defined by an outer periphery of a first oil passage wall extending from the first side wall and an outer peripheral wall of the first accommodation member; and
the second oil passage is radially defined by an outer periphery of a second oil passage wall extending from the second side wall and an outer peripheral wall of the second accommodation member.

5. The lubricating structure according to claim 1, wherein
the partition wall portion has a window at an upper side to which the lubricating oil is scooped up, and the window provides communication between the first oil passage and the second oil passage.

6. The lubricating structure according to claim 5, wherein
a weir that guides lubricating oil, scoped up to the second oil passage, to the window is provided on an outer periphery of a second oil passage wall that defines the second oil passage.

7. The lubricating structure according to claim 1, wherein
the rib radially extends from the bearing portion.

* * * * *